United States Patent [19]

Lee et al.

[11] Patent Number: 5,446,813
[45] Date of Patent: Aug. 29, 1995

[54] OPTICAL ISOLATOR

[75] Inventors: K. Roger Lee; Song-Fure Lin, both of Hsinchu; Yuh-Lin Cheng, Tainan, all of Taiwan

[73] Assignee: Industrial Technology Research Institute, Hsinchu, Taiwan

[21] Appl. No.: 287,362

[22] Filed: Aug. 8, 1994

[51] Int. Cl.6 .................................. G02B 6/26
[52] U.S. Cl. ........................... 385/31; 385/34; 385/36
[58] Field of Search .................. 385/11, 15, 31, 33, 385/34, 36

[56] References Cited

U.S. PATENT DOCUMENTS

| | | | |
|---|---|---|---|
| 4,375,910 | 3/1983 | Seki | 385/1 |
| 4,978,189 | 12/1990 | Blonder et al. | 385/31 |
| 5,040,863 | 8/1991 | Kawakami et al. | 359/484 |
| 5,066,092 | 11/1991 | Droegemueller et al. | 385/33 |
| 5,177,764 | 1/1993 | Nilsson | 372/94 |
| 5,191,467 | 3/1993 | Kapany et al. | 359/341 |
| 5,208,876 | 5/1993 | Pan | 385/11 |
| 5,317,655 | 5/1994 | Pan | 385/11 |

*Primary Examiner*—Frank Gonzalez
*Attorney, Agent, or Firm*—Michael D. Bednarek; Marks & Murase

[57] ABSTRACT

An optical isolator is placed in the path of an input optical fiber and an output optical fiber, the optical isolator comprises: a first GRIN lens for receiving rays emitted from the input optical fiber and converging into parallel rays; a first birefringent crystal wedge for splitting the parallel rays into a first ray polarized along the birefringent crystal's optical axis and a second ray polarized perpendicularly to the optical axis; a second birefringent crystal wedge for recombining the first ray and the second ray wherein at least one of the first birefringent crystal wedge and the second birefringent crystal wedge comprises a birefringent crystal of $YVO_4$; a second GRIN lens for focusing the recombined rays into the output optical fiber through the second birefringent crystal wedge; a Faraday rotator is mounted between the first birefringent crystal wedge and the second birefringent crystal wedge so that the rays emitted from the input optical fiber can be recombined and focused into the output optical fiber, and the rays reflected from the output optical fiber will be diverged and cannot be refocused into the input optical fiber.

7 Claims, 3 Drawing Sheets

OPTICAL ISOLATOR

BACKGROUND OF THE INVENTION

This invention relates an optical isolator, and more particularly to an optical isolator provided with inner polarizers which are made in YVO$_4$ (Yttrium Vanadate) materials.

In present day optical fiber technology, semiconductor lasers are typically used to generate and relay light signals on optical fibers. These lasers are particularly susceptible to light signal reflections, which cause a laser to become unstable and noisy. Optical isolators are used to block these reflected signals from reaching the laser. Ideally, these optical isolators transmit all of the light signals in the forward direction and block all of the signals in the reverse direction.

Of course, optical isolators do not attain ideal performance levels and improvements are constantly being sought. Furthermore, optical fiber technology has an inherently large bandwidth which has encouraged the spread of optical fiber networks. However, one factor which has slowed the use of optical fiber technology has been costs, including those for optical isolators. With an optical isolator generally required for each laser generating signal on an optical fiber, it is highly desirable that the cost of the optical isolators be lowered as much as possible.

Conventionally, polarization dependent optical isolators and polarization independent optical isolators are employed in an optical fiber system. The polarization dependent optical isolator is undesirable since it has many limitations. Conversely, the polarization independent optical isolator is widely used for it is compatible with most light sources.

There are three kinds of prior art polarization independent optical isolators. In U.S. Pat. No. 5,151,955, the disclosed optical isolator employed three birefringent crystals and two magnetic-optical devices. This is not an ideal design, for its price is too high and its beam splitting effect depends on the diameter of the light beam. Furthermore, the U.S. Patent 'OPTICAL DEVICES' (U.S. Pat. No. 4,548,478) and the U.S. Patent 'OPTICAL ISOLATOR' (U.S. Pat. No. 5,208,876) both employed two birefringent crystal wedges as an optical walk-off polarizer and analyzer. The above two patents also display the drawbacks of high cost and low relative refractive index difference; for they used calcite, rutile and lithium niobate as the material for the polarizer and analyzer.

The present invention solves or substantially ameliorates these problems by offering an optical isolator displaying a higher relative refractive index difference, and the benefits of with lower cost and easy manufacture.

SUMMARY OF THE INVENTION

The present invention provides for an improved optical isolator for optical fibers. The optical isolator has a first GRIN (Graded Index) lens for receiving rays emitted from the first optical fiber and converging into parallel rays; a first birefringent crystal wedge for splitting the parallel rays into a first ray polarized along the optical axis and a second ray polarized perpendicularly to the optical axis; a second birefringent crystal wedge for recombining the first ray and the second ray; a second GRIN lens for focusing the recombined rays into the second optical fiber through the second birefringent crystal wedge; a Faraday rotator mounted between the first birefringent crystal wedge and the second birefringent crystal wedge so that the rays emitted from the first optical fiber can be recombined and focused into the second optical fiber, and the rays reflected from the second optical fiber will be diverged and cannot be focused into the first optical fiber. Wherein at least one of the first birefringent crystal wedge and the second birefringent crystal wedge comprises a birefringent crystal of YVO$_4$, which provides higher optical performance and lower cost in comparison with other materials in Table 1.

TABLE I

| material characteristic | YVO$_4$ | Rutile | Calcite | LiNbO$_3$ |
|---|---|---|---|---|
| relative index | at 1.55 um | at 1.53 um | at 1.50 um | at 1.44 um |
| n$_e$ | 2.1486 | 2.709 | 1.477 | 2.141 |
| n$_o$ | 1.9447 | 2.451 | 1.635 | 2.215 |
| Insertion loss (dB) | 0.1 | 0.2 | 0.2 | 0.1 |
| Thermal expansion (/°C.) | 5.75*10$^{-6}$ | 7.14*10$^{-6}$ | 5.4*10$^{-6}$ | 7.5*10$^{-6}$ |
| Moh's hardness | 5 | 6–6.5 | 3 | 5 |
| Relative cost | 1 | 20 | 5 | 1 |

BRIEF DESCRIPTION OF DRAWINGS

Other features and advantages of the invention will be apparent from the following description given in connection with the accompanying drawings wherein:

FIG. 1b is a side view of the birefringent crystal wedge shown in FIG. 1a;

FIG. 2b is a side view of the birefringent crystal wedge shown in FIG. 2a;

FIG. 2c is another side view of the birefringent crystal wedge shown in FIG. 2a;

DETAILED DESCRIPTION OF THE INVENTION

Figure 1A:
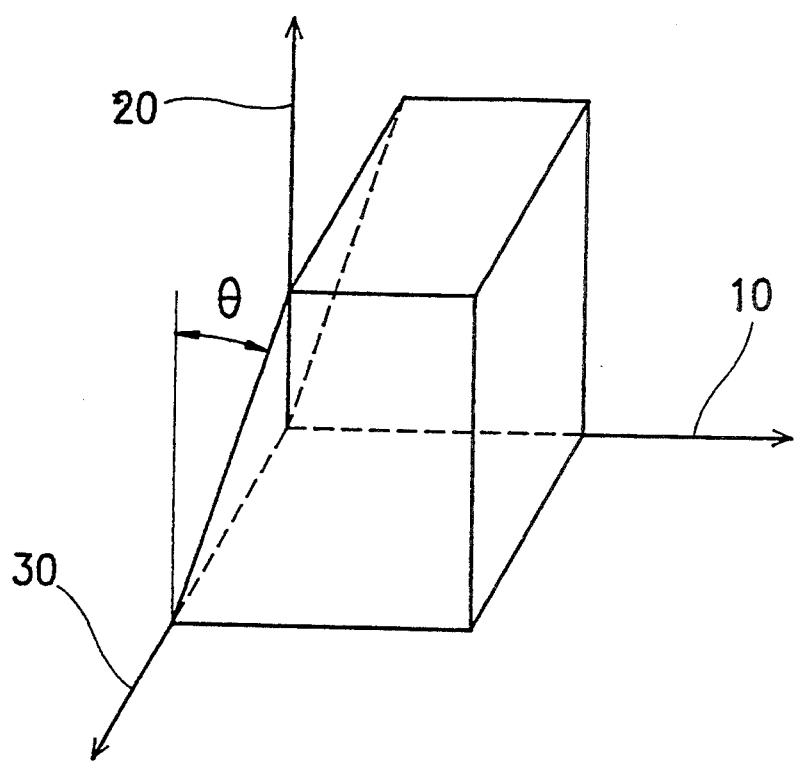
FIG. 1a is a perspective diagram of a birefringent crystal wedge in this invention.
Figure 1B:
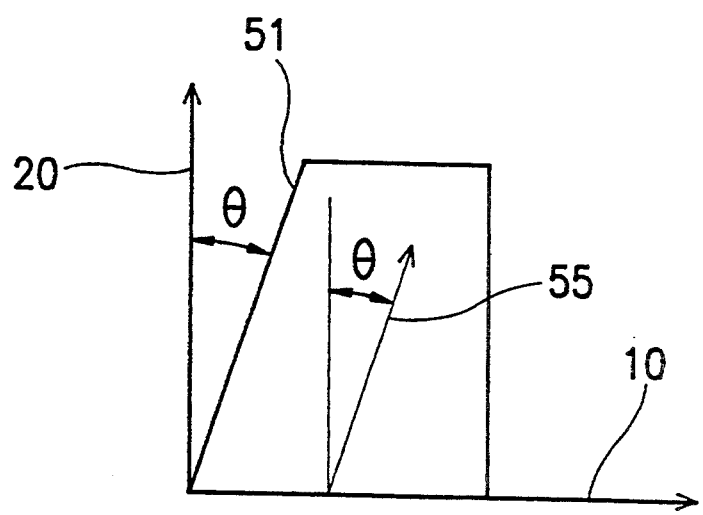
Figure 2A:
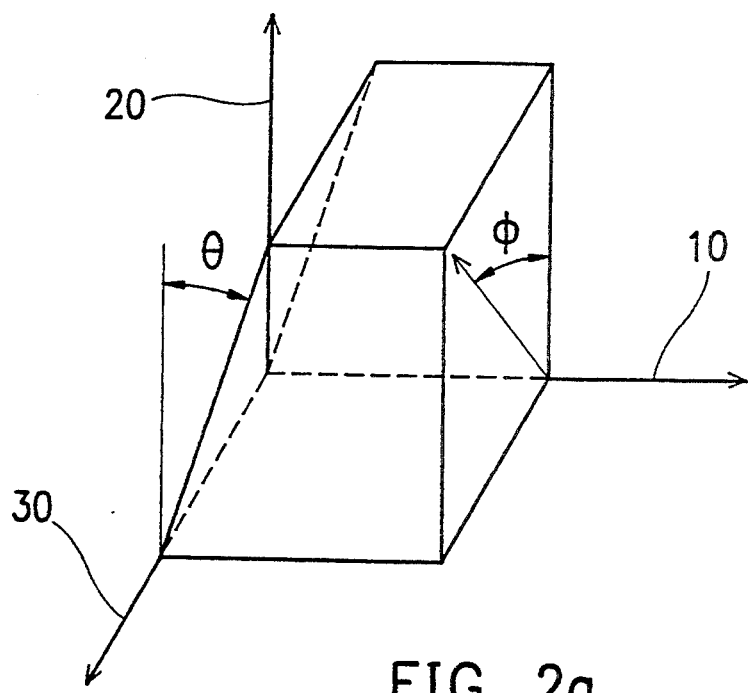
FIG. 2a is a perspective diagram of the other birefringent crystal wedge in this invention.
Figure 2B:
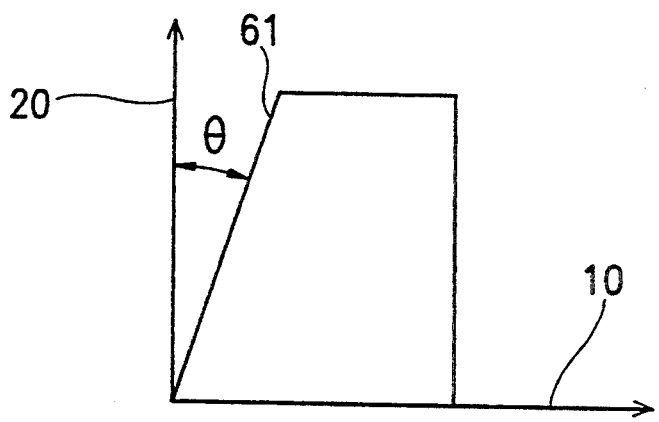
Figure 2C:
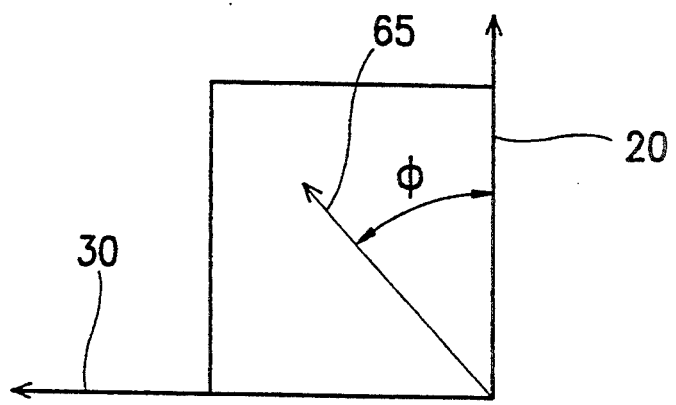

Referring to FIG. 1a, numerals 10, 20 and 30 respectively represent the X-axis, Y-axis and Z-axis of the orthogonal coordinates. Also referring to FIG. 1b, the angle between the slant 51 of a first birefringent crystal wedge and Y-axis 20 is $\Theta$ ($\Theta$ equals 10° in this preferred embodiment), and the optical axis 55 of the first birefringent crystal wedge is perpendicular to Z-axis 30 and is at an angle of (90°-$\Theta$) with respect to X-axis 10. As shown in FIG. 2a, also referring to FIG. 2b, the angle between the slant 61 of a second birefringent crystal wedge and Y-axis 20 is also $\Theta$. Referring now to FIG. 2c, the optical axis 65 of the second birefringent crystal wedge is perpendicular to X-axis 10 and is at an angle of $\phi$ with respect to Y-axis 20 ($\phi$ equals to 45° in the preferred embodiment). The material of the first and the second birefringent crystal wedge is YVO$_4$.

Figure 3:
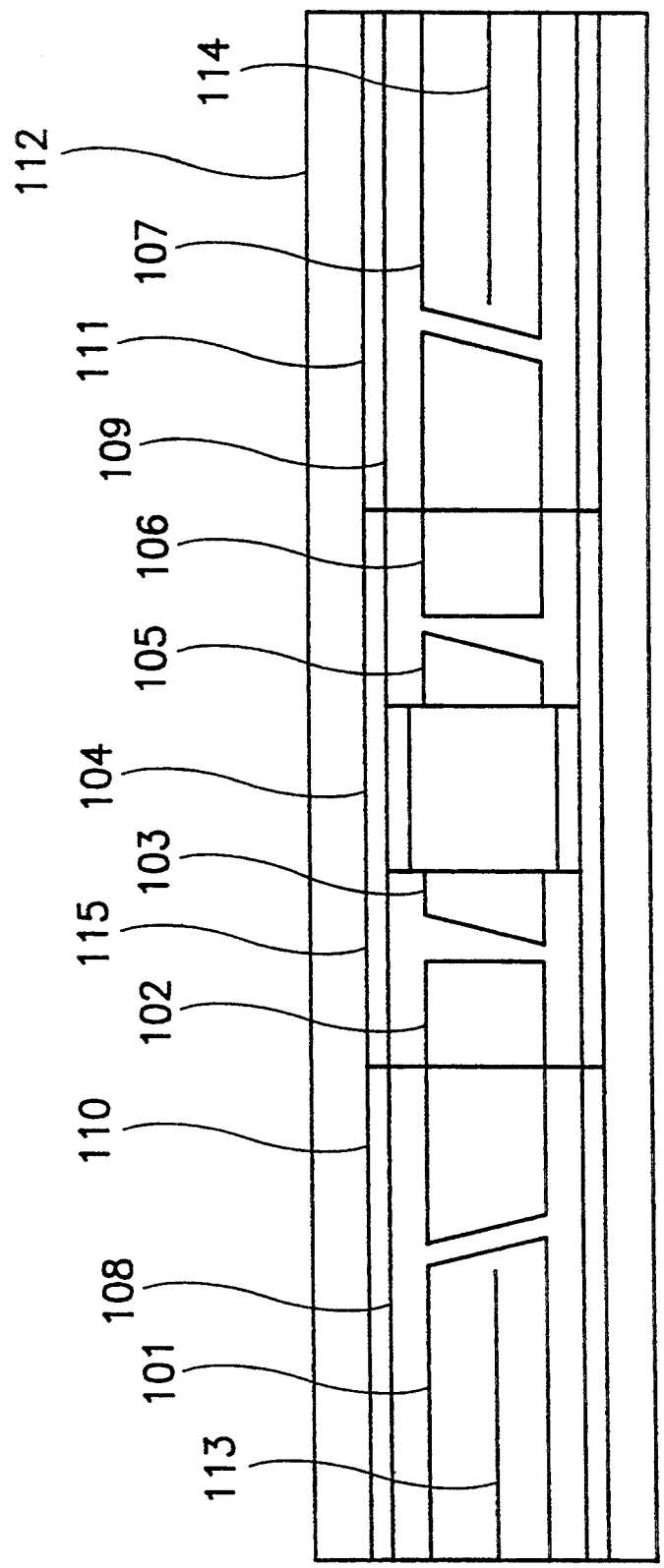
FIG. 3 is a side view of optical isolator according to this invention.

FIG. 3 is a cross-sectional view of an optical isolator of this invention. The optical isolator is placed in the path of an optical fiber, here shown as an input fiber 113 and an output fiber 114, to transmit light signals from the input fiber 113 to the output fiber 114 and to block light signals from the output fiber 114 to the input fiber 113. The optical isolator comprises: a first GRIN lens 102 for receiving rays emitted from the input optical fiber 113 and converging into parallel rays; a first birefringent crystal wedge 103 for splitting the parallel rays into a first ray polarized along the optical axis and a second ray polarized perpendicularly to the optical axis; a second birefringent crystal wedge 105 for recombining the first ray and the second ray wherein at least one of the first birefringent crystal wedge 103 and the second birefringent crystal wedge 105 comprises a birefringent crystal of $YVO_4$; a second GRIN lens 106 for focusing the recombined rays into the output optical fiber 114 through the second birefringent crystal wedge 105; a Faraday rotator 104 mounted between the first birefringent crystal wedge 103 and the Second birefringent crystal wedge 105 (the combination of the first birefringent crystal wedge 103, the Faraday rotator 104 and the second birefringent crystal wedge 105 referred to as an isolating unit hereinafter) so that the rays emitted from the input optical fiber 113 can be recombined and focused into the output optical fiber 114, and the rays reflected from the output optical fiber 114 will be diverged and cannot be focused into the input optical fiber 113.

The optical isolator has two glass ferrules 101 and 107 into which the input optical fiber 113 and the output optical fiber 114 are inserted respectively. The two glass ferrules 101 and 107 are respectively secured with the first GRIN lens 102 and the second GRIN lens 106 by two quartz sleeves 108 and 109. Then the two quartz sleeves 108 and 109 are respectively secured into a first copper sleeve 110 and a second copper sleeve 111. However, the first birefringent crystal wedge 103, the Faraday rotator 104 and the second birefringent crystal wedge 105 (i.e. an isolating unit) are mounted and secured in a third copper sleeve 115. A stainless sleeve is employed to hold the first copper sleeve 110, the second copper sleeve 111 and the third copper sleeve 115; and the third copper sleeve 115 is mounted between the first copper sleeve 110 and the second copper sleeve 111.

Again referring to FIG. 3, light signals from the end of the input optical fiber 113 are transmitted by the first GRIN lens 102 which collimates the light from the end of the fiber 113. The collimated light from the first GRIN lens 102 is then passed through the first birefringent crystal wedge 103 which is called a polarizer. The birefringent crystal wedge 103 separates the incident light from the first GRIN lens 102 into a first ray polarized along the birefringent crystal's optical axis, called an ordinary ray, and a second ray polarized perpendicularly to the optical axis, called an extraordinary ray. The light from the first birefringent crystal wedge 103 is then rotated by the Faraday rotator 104 which rotates the polarized light by 45°. The Faraday rotator 104 is typically formed from YIG (Yttrium Iron Garnet) placed in a permanent magnet.

Then the rotated light is recombined by the second birefringent crystal wedge 105 which is called an analyzer. The optical axis of the second birefringent crystal wedge 105 is oriented 45° with respect to the optical axis of the first birefringent crystal wedge 103. Thus the ordinary ray from the first birefringent crystal wedge 103 is also the ordinary ray of the second birefringent wedge 105 and the extraordinary ray from the first birefringent crystal wedge 103 is also the extraordinary ray of the second birefringent wedge 105. The net result is that after traveling from the first birefringent crystal wedge 103 through the second birefringent crystal wedge 105, the two collimated rays are then negligibly displaced from each other. The two rays are then combined and refocused by the second GRIN lens 106 to a point on the end of the output optical fiber 114.

In the reverse direction, however, light from the output optical fiber 114 is separated by the second birefringent crystal wedge 105 into two, an ordinary ray polarized along the optical axis of the second birefringent crystal wedge 105, and an extraordinary ray polarized perpendicularly to the optical axis. When passing back through the Faraday rotator 104, the light of both rays is rotated 45°. This rotation is non reciprocal with the rotation of light in the forward direction, so that the ordinary ray from the second birefringent crystal wedge 105 is polarized perpendicularly with the optical axis of the first birefringent crystal wedge 103 and the extraordinary ray from the second birefringent crystal wedge 105 is polarized with the optical axis of the first birefringent crystal wedge 103. The ordinary and extraordinary rays from the second birefringent crystal wedge 105 have swapped places incident upon the first birefringent crystal wedge 103. Because of this exchange, the light, having passed through the first birefringent crystal wedge 103, does not leave the first birefringent crystal wedge 103 in parallel rays. The non-parallel light is focused by the first GRIN lens 102 at points which are not located at the end of the input optical fiber 113. Thus light in the reverse direction is not passed back into the input optical fiber 113.

Furthermore, a plurality of isolating units can be connected in series and mounted between the first GRIN lens 102 and the second GRIN lens 106 to form a multiple stages of optical isolator with a better optical isolated effect.

It is further understood by those skilled in the art that the foregoing description is a preferred embodiment of the disclosed device and that various changes and modifications may be made in the invention without departing from the spirit and scope thereof.

What is claimed is

1. An optical isolator mounted in the path between a first optical fiber and a second optical fiber, the optical isolator comprising:
    a first GRIN lens for receiving rays emitted from the first optical fiber and converging into parallel rays;
    a first birefringent crystal wedge for splitting the parallel rays into a first ray polarized along the optical axis of the birefringent crystal and a second ray polarized perpendicularly to the optical axis;
    a second birefringent crystal wedge for recombining the first ray and the second ray wherein at least one of the first birefringent crystal wedge and the second birefringent crystal wedge comprises a birefringent crystal of $YVO_4$;
    a second GRIN lens for focusing the recombined rays into the second optical fiber through the second birefringent crystal wedge;
    a Faraday rotator mounted between the first birefringent crystal wedge and the second birefringent crystal wedge so that the rays emitted from the first optical fiber can be recombined and focused into the second optical fiber, and the rays reflected from the second optical fiber will be diverged and cannot be focused into the first optical fiber.

2. An optical isolator as claimed in claim 1 further comprising a first glass ferrule for holding the first optical fiber and a second glass ferrule for holding the second optical fiber.

3. An optical isolator as claimed in claim 2 further comprising a first quartz sleeve for holding the first glass ferrule and the first GRIN lens and a second quartz sleeve for holding the second glass ferrule and the second GRIN lens.

4. An optical isolator mounted in the path between a first optical fiber and a second optical fiber, the optical isolator comprising:
   a first glass ferrule for holding the first optical fiber;
   a second glass ferrule for holding the second optical fiber;
   a first GRIN lens for receiving rays emitted from the first optical fiber and converging into parallel rays;
   a first quartz sleeve for holding the first glass ferrule and the first GRIN lens;
   a first birefringent crystal wedge for splitting the parallel rays into a first ray polarized along the optical axis of the birefringent crystal and a second ray polarized perpendicularly to the optical axis;
   a second birefringent crystal wedge for recombining the first ray and the second ray wherein at least one of the first birefringent crystal wedge and the second birefringent crystal wedge comprises a birefringent crystal of $YVO_4$;
   a second GRIN lens for focusing the recombined rays into the second optical fiber through the second birefringent crystal wedge;
   a second quartz sleeve for holding the second glass ferrule and the second GRIN lens;
   a Faraday rotator mounted between the first birefringent crystal wedge and the second birefringent crystal wedge so that the rays emitted from the first optical fiber can be recombined and focused into the second optical fiber, and the rays reflected from the second optical fiber will be diverged and cannot be focused into the first optical fiber; and
   a first copper sleeve for holding the first birefringent crystal wedge, the Faraday rotator and the second birefringent crystal wedge.

5. An optical isolator as claimed in claim 4 further comprising a second copper sleeve for holding the first quartz sleeve and a third copper sleeve for holding the second quartz sleeve.

6. An optical isolator as claimed in claim 5 further comprising a stainless sleeve for holding the first copper sleeve, the second copper sleeve and the third copper sleeve, wherein the first copper sleeve is mounted between the second copper sleeve and the third copper sleeve.

7. An optical isolator as claimed in claim 1 or claim 4, wherein a plurality of isolating units are connected in series and mounted between the first GRIN lens and the second GRIN lens to form a multiple stages of optical isolator, and each isolating unit is formed by mounting the Faraday rotator between the first birefringent crystal wedge and the second birefringent crystal wedge.

* * * * *